United States Patent
Joten

(10) Patent No.: US 9,823,501 B2
(45) Date of Patent: Nov. 21, 2017

(54) LIQUID CRYSTAL DISPLAY DEVICE

(71) Applicant: Japan Display Inc., Minato-ku (JP)

(72) Inventor: Kazuhiro Joten, Tokyo (JP)

(73) Assignee: Japan Display Inc., Minato-ku (JP)

( * ) Notice: Subject to any disclaimer, the term of this patent is extended or adjusted under 35 U.S.C. 154(b) by 485 days.

(21) Appl. No.: 14/314,531

(22) Filed: Jun. 25, 2014

(65) Prior Publication Data

US 2015/0002779 A1 Jan. 1, 2015

(30) Foreign Application Priority Data

Jun. 27, 2013 (JP) .................................. 2013-135391

(51) Int. Cl.
*G02F 1/1333* (2006.01)

(52) U.S. Cl.
CPC .................. *G02F 1/133308* (2013.01); *G02F 2001/133331* (2013.01); *G02F 2001/133334* (2013.01)

(58) Field of Classification Search
CPC .......................................... G02F 2001/133331
USPC ........................................................... 349/40
See application file for complete search history.

(56) References Cited

U.S. PATENT DOCUMENTS

| | | | | |
|---|---|---|---|---|
| 2002/0018163 A1* | 2/2002 | Yamamoto | ........ | G02F 1/133308 349/122 |
| 2007/0222912 A1* | 9/2007 | Sato | .................. | G02F 1/133528 349/58 |
| 2011/0285640 A1* | 11/2011 | Park | ..................... | G02F 1/13338 345/173 |
| 2011/0315297 A1* | 12/2011 | Koshio | ................. | G02F 1/1309 156/64 |
| 2012/0206680 A1* | 8/2012 | Onishi | .............. | G02F 1/134336 349/122 |
| 2012/0257151 A1* | 10/2012 | Teramoto | .......... | G02F 1/133512 349/106 |

FOREIGN PATENT DOCUMENTS

| | | |
|---|---|---|
| JP | 2008-209468 A | 9/2008 |
| JP | 2010-102020 | 5/2010 |
| JP | 2012-3177 | 1/2012 |
| JP | 2012-155258 | 8/2012 |
| JP | 2012-155291 A | 8/2012 |

(Continued)

OTHER PUBLICATIONS

Japanese Office Action issued Nov. 8, 2016 in Patent Application No. 2013-135391 (with English Translation).

*Primary Examiner* — Thanh-Nhan P Nguyen
(74) *Attorney, Agent, or Firm* — Oblon, McClelland, Maier & Neustadt, L.L.P.

(57) ABSTRACT

According to one embodiment, a liquid crystal display device includes a first substrate including a first insulative substrate extending over a first area and a second area, a common electrode and a pixel electrode which are formed in the first area, and a pad of ground potential which is formed in the second area, a second substrate including a second insulative substrate, a liquid crystal layer held between the first substrate and the second substrate, a cover glass extending over the first area and the second area, a transparent, electrically conductive layer formed on an inner surface of the cover glass over the first area and the second area, and a connection member configured to electrically connect the electrically conductive layer and the pad in the second area.

9 Claims, 6 Drawing Sheets

(56) References Cited

FOREIGN PATENT DOCUMENTS

| | | |
|---|---|---|
| JP | 2012-242796 A | 12/2012 |
| JP | 2012-247542 | 12/2012 |
| JP | 2012-177895 A | 9/2013 |

* cited by examiner

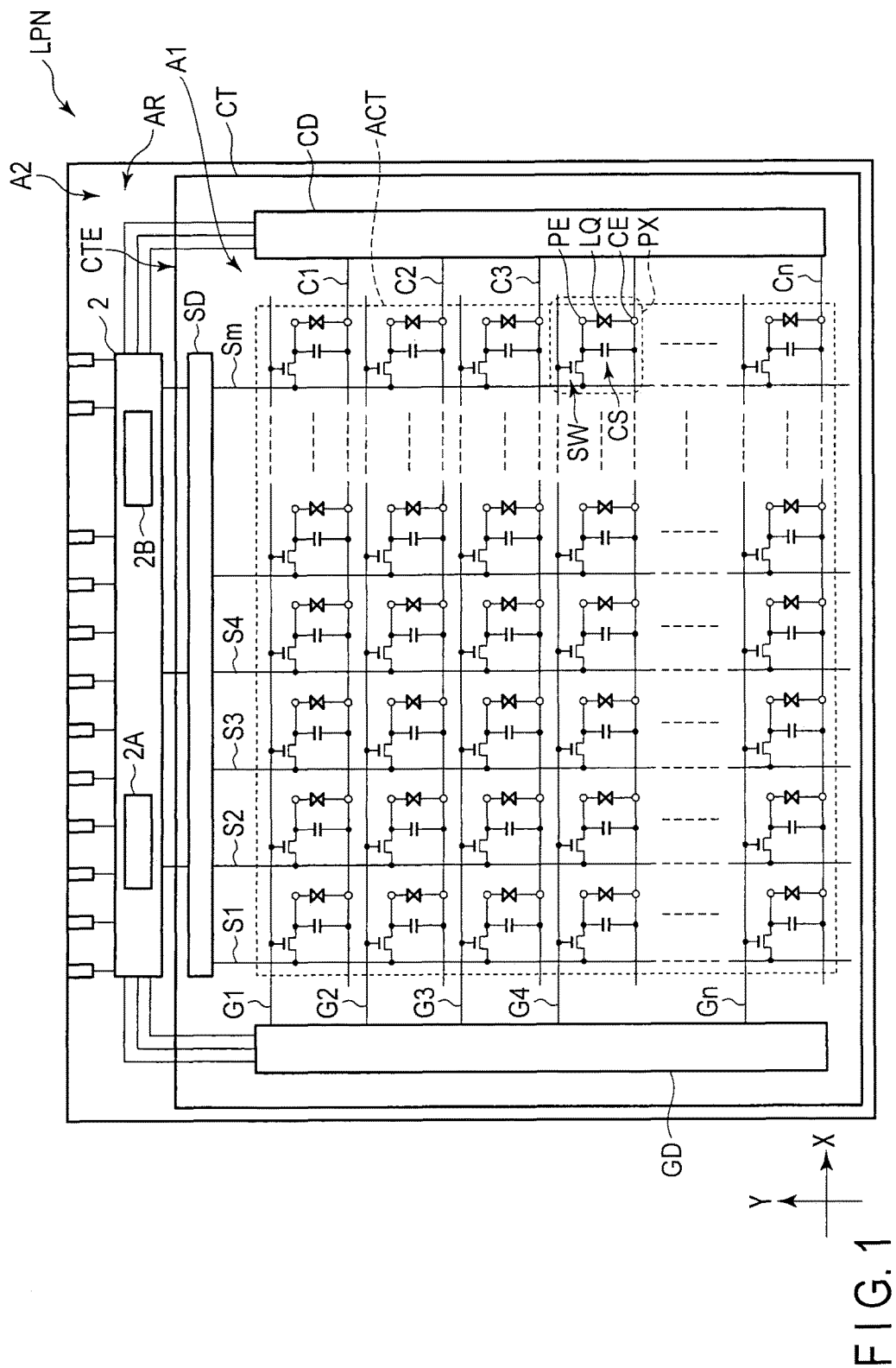
F I G. 1

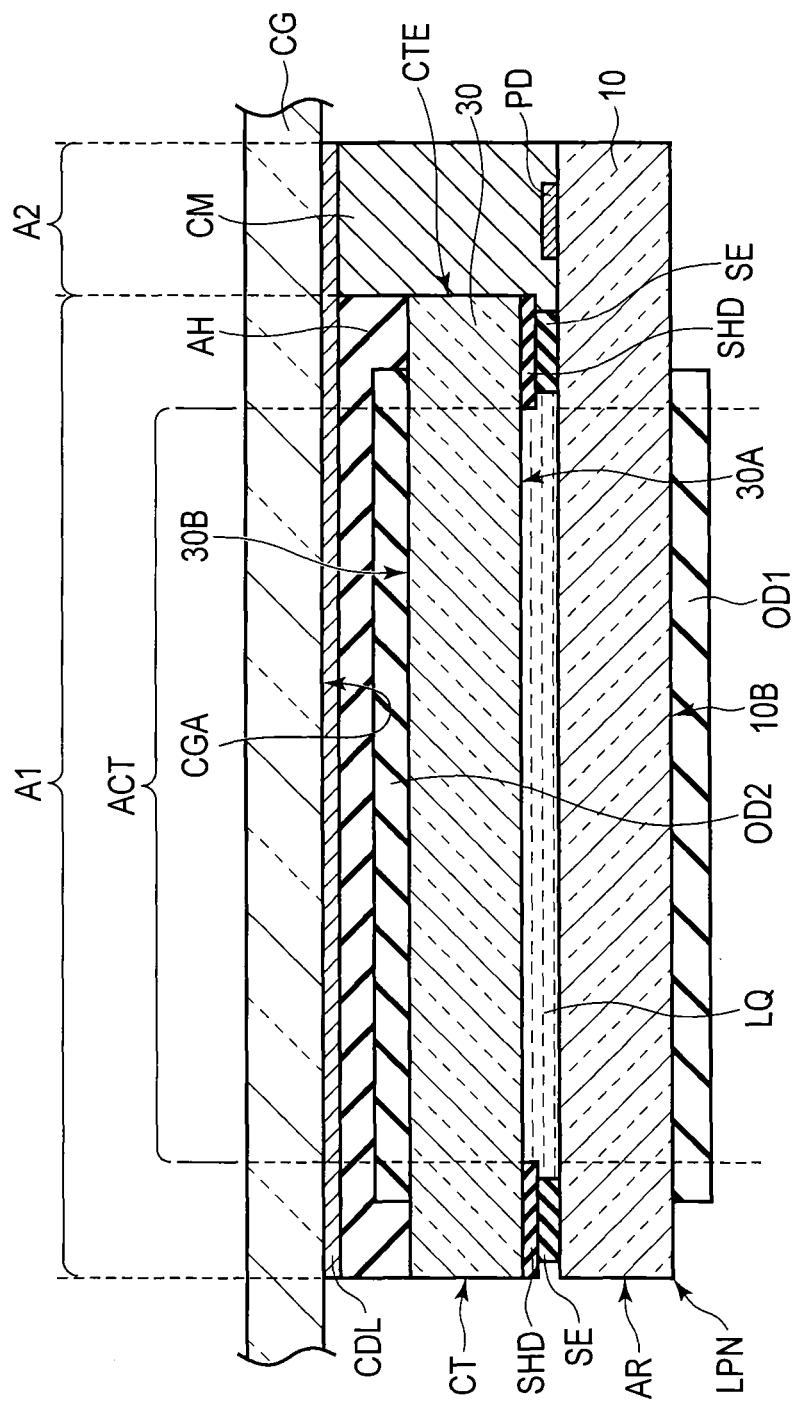
F I G. 4A

LIQUID CRYSTAL DISPLAY DEVICE

CROSS-REFERENCE TO RELATED APPLICATIONS

This application is based upon and claims the benefit of priority from Japanese Patent Application No. 2013-135391, filed Jun. 27, 2013, the entire contents of which are incorporated herein by reference.

FIELD

Embodiments described herein relate generally to a liquid crystal display device.

BACKGROUND

Liquid crystal display devices have been used in various fields as display devices. In recent years, liquid crystal display panels of a fringe field switching (FFS) mode and an in-plane switching (IPS) mode have been put to practical use. The liquid crystal display panel of the FFS mode or IPS mode is configured such that a liquid crystal layer is held between an array substrate, which includes a pixel electrode and a common electrode, and a counter-substrate. On the counter-substrate, almost no electrically conductive film is disposed. Thus, a technique has been proposed for shielding an electric field from the outside, which adversely affects the liquid crystal layer.

For example, there has been proposed a technique of providing an antistatic film including electrically conductive particles, which include either or both of antimony-doped tin oxide (ATO) and tin-doped indium oxide (ITO), and a binder. In addition, there has been proposed a technique of coating a transparent conductive film including electrically conductive inorganic particles and a resin component on a major surface of a transparent substrate, the major surface being located on a side opposite to the liquid crystal layer.

On the other hand, such a technique has been proposed that an optical sheet, which is located on a front-surface side of a protection-plate-integrated liquid crystal display panel, is covered with a transparent sheet, and the protection plate and the transparent sheet are coupled by a resin layer.

BRIEF DESCRIPTION OF THE DRAWINGS

FIG. 1 is a view which schematically illustrates a structure and an equivalent circuit of a liquid crystal display panel LPN which constitutes a liquid crystal display device according to an embodiment.

FIG. 4A is a cross-sectional view which schematically shows a cross section including a pad PD of the liquid crystal display device 1 shown in FIG. 3.

DETAILED DESCRIPTION

Figure 2:
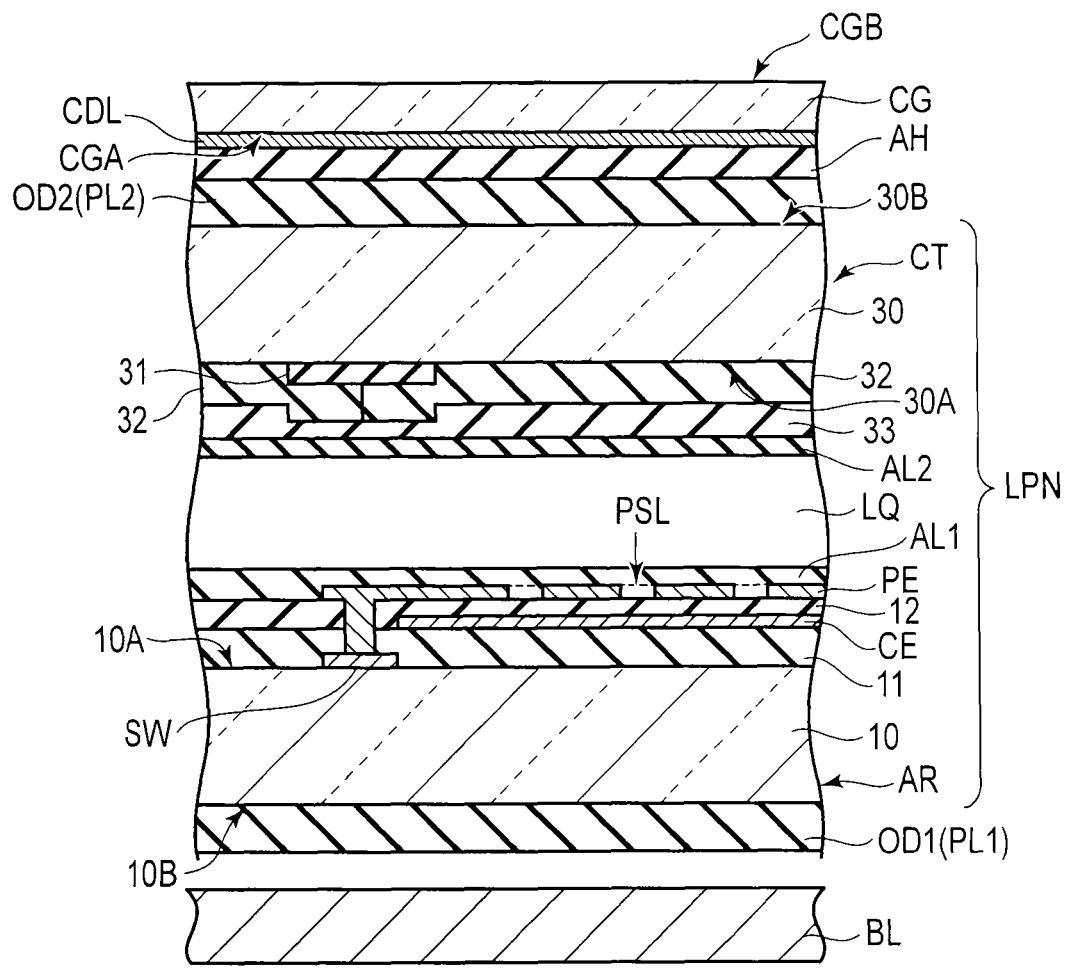
FIG. 2 is a view which schematically shows a cross-sectional structure of the liquid crystal display panel LPN shown in FIG. 1.

In general, according to one embodiment, a liquid crystal display device includes: a first substrate including a first insulative substrate extending over a first area including an active area for displaying an image, and a second area neighboring the first area, a common electrode and a pixel electrode which are formed in the first area of the first insulative substrate, and a pad of ground potential which is formed in the second area; a second substrate including a second insulative substrate which is opposed to the first substrate in the first area; a liquid crystal layer held between the first substrate and the second substrate; a cover glass extending over the first area and the second area and having an inner surface opposed to the second substrate; a transparent, electrically conductive layer formed on the inner surface of the cover glass over the first area and the second area; and a connection member configured to electrically connect the electrically conductive layer and the pad in the second area.

According to another embodiment, a liquid crystal display device includes: an array substrate including a first insulative substrate extending over a first area including an active area for displaying an image, and a second area neighboring the first area, a first optical element disposed on an outer surface of the first insulative substrate, a pad of ground potential which is formed in the second area, and a gate line, a source line, a switching element, a pixel electrode and a common electrode which are formed, respectively, in the first area of an inner surface of the first insulative substrate, the gate line extending in a first direction, the source line extending in a second direction crossing the first direction, the switching element being electrically connected to the gate line and the source line, the pixel electrode being electrically connected to the switching element, and the common electrode being opposed to the pixel electrode via an insulation layer; a counter-substrate including a second insulative substrate opposed to the array substrate in the first area, and a second optical element disposed on an outer surface of the second insulative substrate; a liquid crystal layer held between the array substrate and the counter-substrate; a cover glass extending over the first area and the second area and having an inner surface opposed to the counter-substrate; an electrically conductive layer of a tin (Sn)-antimony (Sb)-based oxide, the electrically conductive layer being formed on the inner surface of the cover glass over the first area and the second area; and a connection member configured to electrically connect the electrically conductive layer and the pad in the second area.

According to another embodiment, a liquid crystal display device includes: an array substrate including a first insulative substrate with light transmissivity, a first optical element disposed on an outside of the first insulative substrate, and a gate line, a source line, a switching element, a pixel electrode and a common electrode which are formed, respectively, on an inside of the first insulative substrate, the gate line extending in a first direction, the source line extending in a second direction crossing the first direction, the switching element being electrically connected to the gate line and the source line, the pixel electrode being electrically connected to the switching element, and the common electrode being opposed to the pixel electrode via an insulation layer; a counter-substrate including a second insulative substrate which is opposed to the array substrate and has light transmissivity, and a second optical element disposed on an outside of the second insulative substrate; a sealant which attaches the array substrate and the counter-substrate; a liquid crystal layer surrounded by the sealant and held between the array substrate and the counter-substrate; a cover glass disposed on an outside of the counter-substrate and having a larger size than the array substrate; and an electrically conductive layer of a tin (Sn)-antimony (Sb)-based oxide, the electrically conductive layer being formed on a surface of the cover glass up to an end portion of the cover glass, wherein a surface resistance value of the electrically conductive layer is $1 \times 10^9 \Omega/\square$ or less.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display panel LPN which constitutes a liquid crystal display device according to an embodiment.

Specifically, the liquid crystal display device includes a liquid crystal display panel LPN of an active matrix type. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes a first area A1 including an active area ACT which displays an image, and a second area A2 neighboring the first area A1. The array substrate AR extends over the first area A1 and second area A2. The first area A1 corresponds to an area where the array substrate AR and counter-substrate CT are opposed. In this first area A1, the active area ACT corresponds to an area where the liquid crystal layer LQ is held between the array substrate AR and the counter-substrate CT, and has, for example, a rectangular shape. The active area ACT is composed of a plurality of pixels PX which are arrayed in a matrix. The second area A2 corresponds to that area (extension portion) of the array substrate, which extends outward from an end portion CTE of the counter-substrate CT.

The array substrate AR includes, in the active area ACT, a plurality of gate lines G (G1 to Gn) and a plurality of capacitance lines C (C1 to Cn), which extend in a first direction X, a plurality of source lines S (S1 to Sm) which extend in a second direction Y crossing the first direction X, a switching element SW which is electrically connected to the gate line G and source line S in each pixel PX, a pixel electrode PE which is electrically connected to the switching element SW in each pixel PX, and a common electrode CE which is a part of the capacitance line C and is opposed to the pixel electrode PE. A storage capacitance CS is formed, for example, between the capacitance line C and pixel electrode PE.

The common electrode CE is commonly formed over a plurality of pixels PX in the first area A1. The pixel electrode PE is formed in an island shape in each pixel PX.

Each of the gate lines G is led out of the active area ACT and is connected to a first driving circuit GD. Each of the source lines S is led out of the active area ACT and is connected to a second driving circuit SD. Each of the capacitance lines C is led out of the active area ACT and is connected to a third driving circuit CD. For example, at least parts of the first driving circuit GD, second driving circuit SD and third driving circuit CD are formed on the array substrate AR and are connected to a driving IC chip 2. The driving IC chip 2 includes a controller for controlling the first driving circuit GD, second driving circuit SD and third driving circuit CD, and functions as a signal supply source for supplying a signal which is necessary for driving the liquid crystal display panel LPN. In the example illustrated, the driving IC chip 2 is mounted on the array substrate AR in the second area A2.

The driving IC chip 2 includes an image signal write circuit 2A which executes control necessary for writing an image signal in the pixel electrode PE of each pixel PX in an image display mode for displaying an image in the active area ACT. In the meantime, the driving IC chip 2 may also include, in addition to the image signal write circuit 2A, a detection circuit 2B which detects a variation of an electrostatic capacitance of a sensing element in a touch-sensing mode for detecting a contact of an object on a detection surface. The sensing element is composed of, for example, the capacitance line C and source line S which extend via an insulation film. In the meantime, the sensing element is not limited to the combination of the capacitance line C and source line S, and may be configured by making use of an electrode within the active area in addition to the above-described lines, or may be configured by disposing a detection electrode or a detection line in addition to the above-described lines and electrode.

In addition, the liquid crystal display panel LPN of the illustrated example is configured to be applicable to an FFS mode or an IPS mode, and includes the pixel electrode PE and common electrode CE on the array substrate AR. In the liquid crystal display panel LPN with this structure, liquid crystal molecules, which constitute the liquid crystal layer LQ, are switched by mainly using a lateral electric field which is produced between the pixel electrode PE and common electrode CE (e.g. that part of a fringe electric field, which is substantially parallel to a major surface of the substrate).

FIG. 2 is a view which schematically shows a cross-sectional structure of the liquid crystal display panel LPN shown in FIG. 1.

Specifically, the array substrate AR is formed by using a first insulative substrate 10 with light transmissivity, such as a glass substrate. The array substrate AR includes the switching element SW, common electrode CE, pixel electrode PE and a first alignment film AL1 on an inner surface 10A side of the first insulative substrate 10, which is opposed to the counter-substrate CT.

The switching element SW illustrated in this example is, for instance, a thin-film transistor (TFT). The switching element SW includes a semiconductor layer which is formed of polysilicon or amorphous silicon. In the meantime, the switching element SW may be of a top gate type or a bottom gate type. The switching element SW is covered with a first insulation film 11.

The common electrode CE is formed on the first insulation film 11. The common electrode CE is covered with a second insulation film 12. The second insulation film 12 is also disposed on the first insulation film 11. The pixel electrode PE is formed on the second insulation film 12. The pixel electrode PE is electrically connected to the switching element SW via a contact hole which penetrates the first insulation film 11 and second insulation film 12. In addition, the pixel electrode PE includes slits PSL which are opposed to the common electrode CE via the insulation film 12. The common electrode CE and pixel electrodes PE are formed of a transparent, electrically conductive material such as indium tin oxide (ITO) or indium zinc oxide (IZO). The pixel electrode PE and the second insulation film 12 are covered with the first alignment film AL1. The first alignment film AL1 is formed of a material which exhibits horizontal alignment properties, and is disposed on that surface of the array substrate AR, which is in contact with the liquid crystal layer LQ.

On the other hand, the counter-substrate CT is formed by using a second insulative substrate 30 with light transmissivity, such as a glass substrate. The counter-substrate CT includes, as dielectric thin films, a black matrix 31, color filters 32, an overcoat layer 33 and a second alignment film AL2 on an inner surface 30A side of the second insulative substrate 30, which is opposed to the array substrate AR.

The black matrix 31 is formed on the inner surface 30A of the second insulative substrate 30 so as to be opposed to wiring portions, such as gate lines G, source lines G and switching elements SW, which are provided on the array substrate AR.

The color filters 32 are formed on the inner surface 30A of the second insulative substrate 30, and also extend over the black matrix 31. The color filters 32 are formed of resin materials which are colored in mutually different colors, e.g. three primary colors of red, blue and green. Boundaries between the color filters CF of different colors overlap the black matrix 31.

The overcoat layer 33 covers the black matrix 31 and color filters 32. The overcoat layer 33 planarizes asperities on the surface of the black matrix 31 and color filters 32. The overcoat layer 33 is formed of a transparent resin material. The overcoat layer 33 is covered with the second alignment film AL2. The second alignment film AL2 is formed of a material which exhibits horizontal alignment properties, and is disposed on that surface of the counter-substrate CT, which is in contact with the liquid crystal layer LQ. The first alignment film AL1 and second alignment film AL2 are subjected to alignment treatment in mutually parallel directions in a plane parallel to substrate major surfaces.

The above-described array substrate AR and counter-substrate CT are disposed such that their first alignment film AL1 and second alignment film AL2 are opposed to each other. In this case, a columnar spacer, which is integrally formed on one of the array substrate AR and counter-substrate CT, is disposed between the array substrate AR and counter-substrate CT. Thereby, a predetermined cell gap is created. The array substrate AR and counter-substrate CT are attached by a sealant in the state in which the cell gap is created. The liquid crystal layer LQ is sealed between the first alignment film AL1 of the array substrate AR and the second alignment film AL2 of the counter-substrate CT. The liquid crystal layer LQ is composed of a liquid crystal material having, for example, a positive (positive-type) dielectric constant anisotropy.

A backlight BL is disposed on the back side of the liquid crystal display panel LPN having the above-described structure. Although various modes are applicable to the backlight BL, a description of the detailed structure of the backlight BL is omitted.

A first optical element OD1 including a first polarizer PL1 is disposed on an outer surface of the liquid crystal display panel LPN, that is, an outer surface 10B of the first insulative substrate 10. In addition, a second optical element OD2 including a second polarizer PL2 is disposed on an outer surface of the liquid crystal display panel LPN, that is, an outer surface 30B of the second insulative substrate 30. A first polarization axis of the first polarizer PL1 and a second polarization axis of the second polarizer PL2 are disposed, for example, in a positional relationship of crossed Nicols.

In the example illustrated, furthermore, a cover class CG, which is opposed to the counter-substrate CT, is disposed. A transparent, electrically conductive layer CDL is formed on an inner surface CGA of the cover glass CG. The conductive layer CDL covers at least the entirety of the active area, and is formed of a transparent, electrically conductive material. To be more specific, the conductive layer CDL is formed of a tin (Sn)-antimony (Sb)-based oxide (in some cases, referred to as ATO). In addition, it is desirable that the surface resistance value of the conductive layer CDL be 10 MΩ/□ or more, and 1000 MΩ/□ or less. This conductive layer CDL functions as an antistatic layer (or a shield electrode) which prevents entrance of undesired electric charge or noise from the outside into the liquid crystal display panel LPN.

An outer surface CGB of the cover glass CG serves as a detection surface or a display surface. The cover glass CG and the second optical element OD2 are attached by a transparent adhesive AH. The adhesive AH is formed of a photosensitive resin material such as an ultraviolet-curing resin. Thereby, the liquid crystal display panel LPN and the cover glass CG are integrated as one piece in a state in which the first optical element OD1 and second optical element OD2 are included.

In the liquid crystal display device having the above-described structure, in a state in which no voltage is applied to the liquid crystal layer LQ, that is, in a state (OFF time) in which no electric field is produced between the pixel electrode PE and common electrode CE, liquid crystal molecules included in the liquid crystal layer LQ are aligned in the alignment treatment directions of the first alignment film AL1 and second alignment film AL2 in the plane. At the OFF time, part of light from the backlight BL passes through the first polarizer PL1 and enters the liquid crystal display panel LPN. The light, which enters the liquid crystal display panel LPN, is linearly polarized light which is perpendicular to the first polarization axis of the first polarizer PL1. The polarization state of such linearly polarized light hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a fringe electric field is produced between the pixel electrode PE and common electrode CE, the liquid crystal molecules LM are aligned in a direction different from the initial alignment direction in the plane. In the case of the positive-type liquid crystal material, the liquid crystal molecules are aligned in a direction which is substantially parallel to the electric field. At such ON time, linearly polarized light, which is perpendicular to the first polarization axis of the first polarizer PL1, enters the liquid crystal display panel LPN, and the polarization state of such linearly polarized light varies depending on the alignment state of the liquid crystal molecules LM when the light passes through the liquid crystal layer LQ. Thus, at the ON time, at least part of the light emerging from the liquid crystal layer LQ passes through the second polarizer PL2 (white display).

Figure 3:
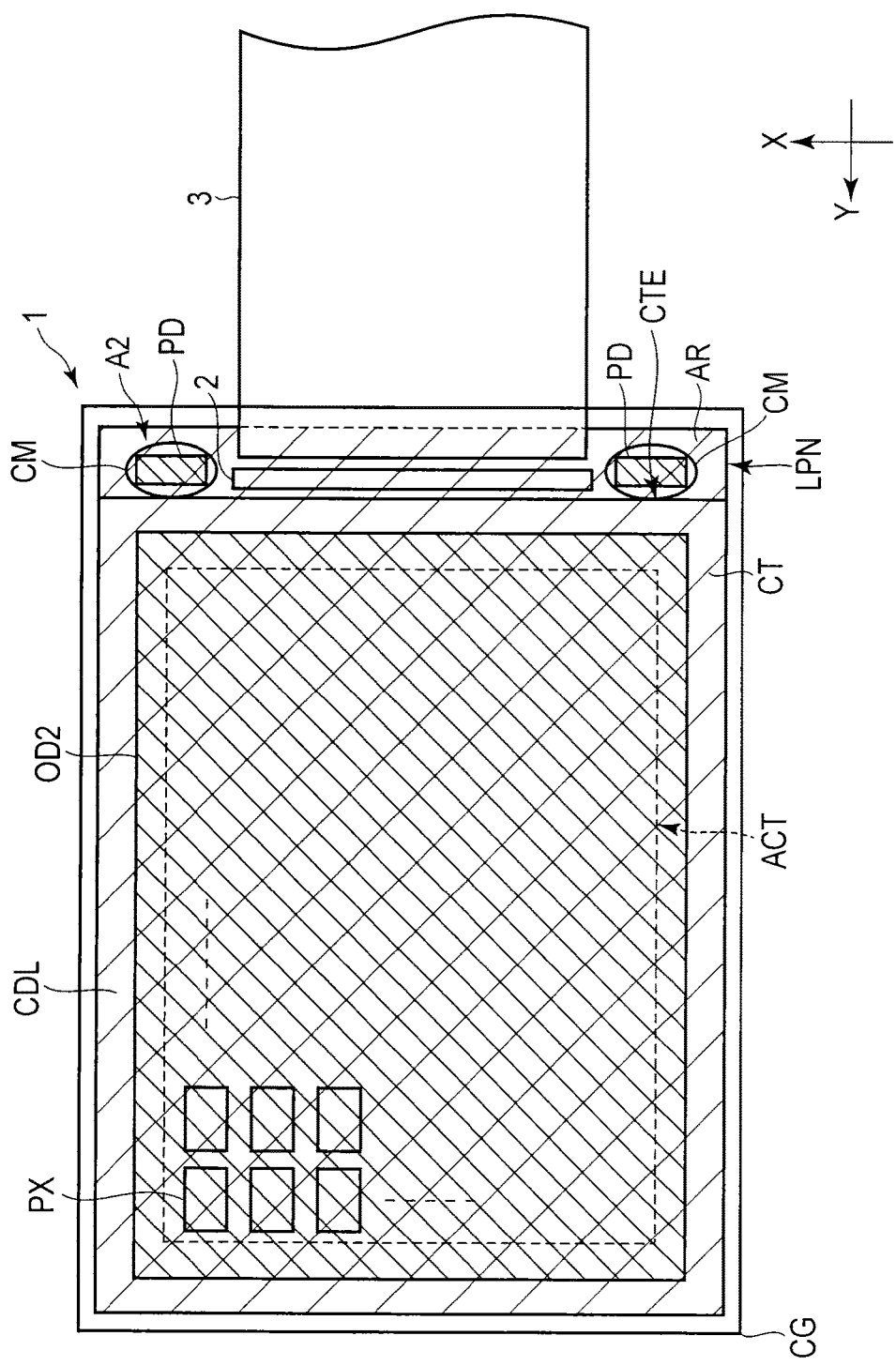
FIG. 3 is a plan view which schematically illustrates a liquid crystal display device 1 according the embodiment.

FIG. 3 is a plan view which schematically illustrates the liquid crystal display device 1 according the embodiment.

The array substrate AR, which constitutes the liquid crystal display panel LPN, includes the second area A2 (extension portion) which extends outward from the end portion CTE of the counter-substrate CT. In the second area A2, signal supply sources, such as the driving IC chip 2 and a flexible printed circuit (FPC) board 3, are mounted. In addition, in the second area A2, a pad PD of a ground potential is formed. Although not described in detail, the pad PD is grounded via the driving IC chip 2 and FPC board 3. In the example illustrated, pads PD are provided on both sides of the signal supply sources, but the number of pads PD, which are provided, is not limited. The second optical element OD2 is disposed on the counter-substrate CT such that the second optical element OD2 overlaps the entirety of the active area ACT.

The cover glass CG has a size slightly larger than the liquid crystal display panel LPN. Specifically, the cover glass CG is disposed in a manner to overlap the active area ACT and the area where the signal supply sources are mounted. The conductive layer CDL extends, within the inner surface of the cover glass CG, at least from the area overlapping the active area ACT to the area overlapping the pads PD, as indicated by lower-rightward slanting lines in FIG. 3 when the FPC board 3 in FIG. 3 is viewed on the right side of FIG. 3. The conductive layer CDL may be disposed over the entirety of the inner surface of the cover glass CG.

The conductive layer CDL and the pad PD are electrically connected by a connection member CM. The connection member CM creates a gap between the array substrate AR and the cover glass CG, and is formed of a resin material containing electrically conductive particles. For example, as the connection member CM, use may be made of a material in which conductive particles of, e.g. silver (Ag) are dispersed in a photosensitive resin material such as an ultraviolet-curing resin. This connection member CM is disposed in an area different from the area where the signal supply sources are mounted. Specifically, the connection member CM is not in contact with the driving IC chip 2 and flexible printed circuit (FPC) board 3.

FIG. 4A is a cross-sectional view which schematically shows a cross section including the pad PD of the liquid crystal display device 1 shown in FIG. 3.

As regards the array substrate AR, although a detailed description of the structure of the inner surface side opposed to the counter-substrate CT is omitted, the pad PD of ground potential is formed in the second area A2. The first optical element OD1 is attached to the outer surface 10B of the first insulative substrate 10 which constitutes the array substrate AR. The first optical element OD1 is disposed over the entirety of the active area ACT.

Although a detailed description of the structure of the counter-substrate CT is omitted, the second insulative substrate 30 is opposed to the array substrate AR in the first area A1, and is missing in the second area A2. The end portion CTE is located at a boundary between the first area A1 and second area A2. A peripheral shield layer SHD is formed on the inner surface 30A of the second insulative substrate 30, which is opposed to the array substrate AR. The peripheral shield layer SHD is formed around the active area ACT. Although not described in detail, the peripheral shield layer SHD is formed in a rectangular frame shape surrounding the active area ACT. For example, the peripheral shield layer SHD is formed of the same material as the above-described black matrix 31. The second optical element OD2 is attached to the outer surface 30S of the second insulative substrate 30. The second optical element OD2 is disposed over the entirety of the active area ACT.

The array substrate AR and the counter-substrate CT are attached by a sealant SE. The liquid crystal layer LQ is held between the array substrate AR and the counter-substrate CT.

The cover glass CG extends over the first area A1 and second area A2. In addition, the cover glass CG further extends outward from the first area A1 and second area A2.

The conductive layer CDL is formed on the inner surface CGA of the cover glass CG. The conductive layer CDL not only covers the first area A1 including the active area ACT, but also extends to the second area A2. The cover glass CG and the counter-substrate CT including the second optical element OD2 are attached by the transparent adhesive AH. The adhesive AH is interposed, in the first area A1, between the counter-substrate CT or second optical element OD2, and the conductive layer CDL of the cover glass CG. In the example illustrated, the adhesive AH extends to the end portion of the second insulative substrate 30, and covers the entirety of the counter-substrate CT. In the first area A1, the entirety of the second optical element OD2 is covered with the adhesive AH.

In the second area A2, the connection member CM is interposed between the array substrate AR and the cover glass CG, and creates a desired gap between the array substrate AR and the cover glass. This connection member CM electrically connects the pad PD and the conductive layer CDL. In the example illustrated, the connection member CM is in contact with the adhesive AH and the end portion CTE of the counter-substrate CT at the boundary between the first area A1 and second area A2.

Figure 4B:
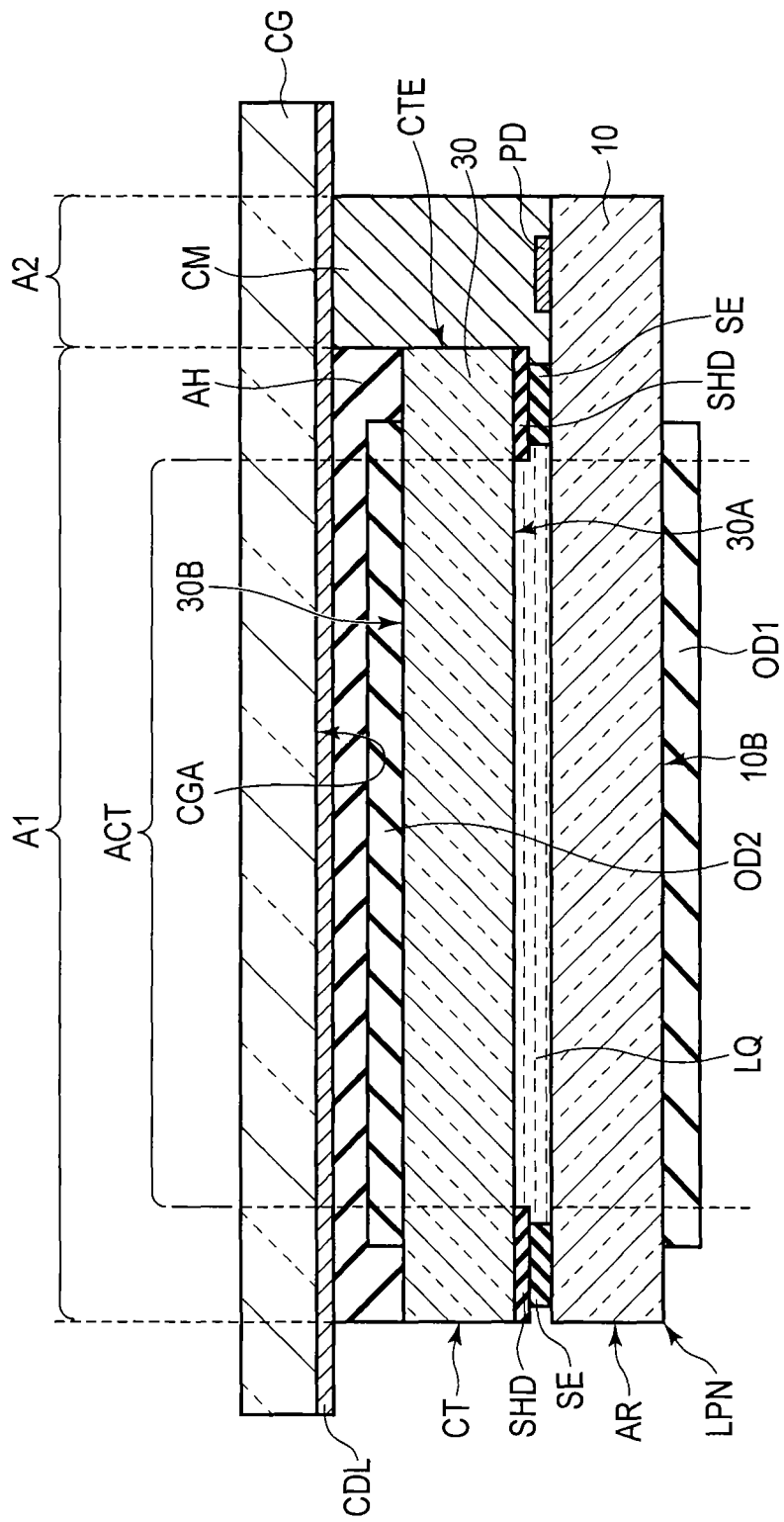
FIG. 4B is a cross-sectional view which schematically shows another cross section including the pad PD of the liquid crystal display device 1 shown in FIG. 3.

FIG. 4B is a cross-sectional view which schematically shows another cross section including the pad PD of the liquid crystal display device 1 shown in FIG. 3.

The example illustrated differs from the example shown in FIG. 4A in that the conductive layer CDL covers the first area A1 and second area A2, and extends up to an end portion of the cover glass CG. Incidentally, the other structure is the same as in the example of FIG. 4A, and a description thereof is omitted.

In the liquid crystal display panel LPN of the FFS mode or IPS mode, which has been described in the present embodiment, the array substrate AR includes various electrodes such as the pixel electrodes PE and common electrode CE, and various wiring lines such as the gate lines G and source lines S. On other hand, the counter-substrate CT includes no electrode or wiring line, but includes dielectric thin films such as the black matrix 31, color filters 32, overcoat layer 33 and second alignment film AL2. Thus, compared to the array substrate AR, the counter-substrate CT tends to be electrified more easily, and undesired electric charge tends to more easily enter the liquid crystal display panel LPN. For example, if electric charge enters from the counter-substrate CT side, and thus an undesired voltage is locally applied to the liquid crystal layer LQ, there is a concern that such an undesired voltage is recognized as nonuniformity in display.

Figure 5:
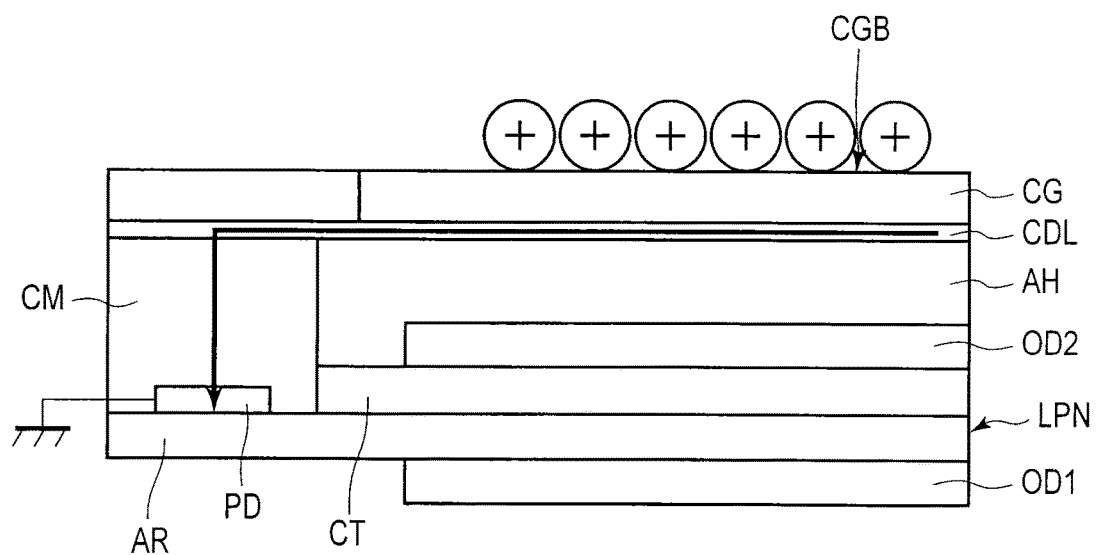
FIG. 5 is a cross-sectional view which schematically illustrates a state of electric discharge in the liquid crystal display device of the embodiment.

According to the present embodiment, the conductive layer CDL, which is formed on the inner surface CGA of the cover glass CG, and the pad PD of ground potential, which is formed on the array substrate AR, are electrically connected by the connection member CM. Thus, as illustrated in FIG. 5, when electric discharge has occurred on the outer surface CGB of the cover glass CG, which serves as the detection surface or the display surface, the external charge coming toward the liquid crystal display panel LPN quickly diffuses in the plane overlapping the active area ACT in the conductive layer CDL with relatively low resistance, and flows into the pad PD of ground potential via the connection member CM. Accordingly, the entrance of electric charge to the liquid crystal layer of the liquid crystal display panel LPN can be prevented. In another case, even if electric charge comes in toward the liquid crystal display panel LPN, the charge that has come in is discharged via the conductive layer CDL. Therefore, the nonuniformity in display, which is visually recognized, can be eliminated in a short time.

In addition, according to the embodiment, since the conductive layer CDL is formed of ATO, the conductive layer CDL can be easily formed, compared to a transparent conductive material such as indium tin oxide (ITO), and can be formed at low cost. In the embodiment, the conductive layer CDL is formed by coating ATO on the cover glass CG. Thus, compared to the case of forming the conductive layer CDL of ITO by sputtering, the manufacturing cost can be reduced. Besides, compared to ITO, ATO has a low film-thickness dependency of the resistance value, and a desired resistance value can easily be obtained. Furthermore, when such a problem occurs that a desired resistance value of the conductive layer CDL cannot be obtained, the conductor layer CDL, after peeled, may be re-formed, and thereby the cover glass CG is not wasted. Alternatively, by substituting a cover glass CG having a conductive layer CDL of a desired resistance value, the liquid crystal display device is not sacrificed. Thereby, the manufacturing cost can be suppressed.

Moreover, according to the embodiment, the amount of the material used can be reduced, the selection margin of material can be increased, and thus the cost can be reduced. Specifically, in the structure in which the cover glass CG and liquid crystal display panel LPN are attached, a gap keeping member for keeping the gap between the cover glass CG and array substrate AR is needed in addition to the adhesive AH. Besides, in a comparative example in which a conductive layer is formed on an outer surface of the counter-substrate or an outer surface of the second optical element, a conductive paste for electrically connecting the conductive layer and the pad is further needed. Specifically, at least three kinds of materials, namely the adhesive, gap keeping member and conductive paste, need to be prepared. In addition, in the structure in which these materials come in contact with each other, since it is required that the materials be chemically stable (i.e., no degradation occurs due to a reaction), the selection margin of material is considerably limited. On the other hand, according to the present embodiment, compared to the above-described comparative example, since the connection member CM is applied for keeping the gap between the cover glass CG and the array substrate AR and for electrically connecting the conductive layer CDL on the inner surface of the cover glass CG and the pad PD, there is no need to prepare a conductive paste in addition to the gap keeping member, and the amount of the material used can be reduced. Moreover, since the chemical stability of the respective materials can be secured, the selection margin of material can be increased. In addition, in general, the cover glass CG, compared to the optical element such as a polarizer, has low expansion or contraction due to heat. Thus, in the embodiment in which the conductive layer CDL is formed on the cover glass CG, it is possible to reduce the load on the contact portion between the conductive layer CDL and connection member CM due to the influence of heat, and to suppress peeling between the conductive layer CDL and connection member CM. Besides, as the adhesive AH surrounding the second optical element OD2, a material which can secure stability of the second optical element OD2 can be selected.

Furthermore, according to the embodiment, since the surface resistance value of the conductive layer CDL is 1000 M$\Omega$/□ or less, it is possible to quickly collect electric charge diffusing in the conductive layer CDL, and to eliminate the nonuniformity in display in a short time even if electric discharge occurs on the surface of the cover glass CG. In short, the conductive layer CDL realizes prevention of electrification of the counter-substrate CT or prevention of local presence of electric charge. In order to realize these, it should suffice if the conductive layer CDL has such a degree of conductivity that electric charge coming toward the counter-substrate CT is diffused in the plane. According to the study by the inventor, it was confirmed by the results of various experiments that a lower resistance is desirable but a relatively high resistance is tolerable.

Next, one of the experiments conducted by the invention will be described. Specifically, samples, in which conductive layers CDL with different surface resistance values are formed on inner surfaces CGA of cover glasses CG, were prepared. With respect to each sample, after the sample was attached to the liquid crystal display panel, 15 kV was applied by using an electrostatic gun, and it was confirmed whether nonuniformity in display disappeared within one second. In cases where the surface resistance values of the conductive layers CDL are 1 M$\Omega$/□, 5 M$\Omega$/□, 10 M$\Omega$/□, 50 M$\Omega$/□, 100 M$\Omega$/□, 500 M$\Omega$/□, 800 M$\Omega$/□, and 1000 M$\Omega$/□, the nonuniformity in display disappeared within one second. On the other hand, in cases where the surface resistance values of the conductive layers CDL are 1200 M$\Omega$/□ and 1500 M$\Omega$/□, the nonuniformity in display did not disappear within one second. Based on this experiment, it was confirmed that the upper limit value of the surface resistance value of the conductive layer CDL is 1000 M$\Omega$/□.

In the meantime, in the liquid crystal display device which incorporates an electrostatic capacitance-type sensing element, it is necessary to secure the sensitivity of the sensing. In order to realize this function, it is necessary that the conductive layer CDL have a relatively high resistance. It is thus desirable that the surface resistance value of the conductive layer CDL be 10 M$\Omega$/□ or more.

One of the experiments conducted by the invention will be described. Specifically, samples, in which conductive layers CDL with different surface resistance values are formed on inner surfaces CGA of cover glasses CG, were prepared. With respect to each sample, after the sample was attached to the liquid crystal display panel, it was confirmed whether a contact at specific detection points (plural points) on the detection surface can be sensed in the sensing element. In cases where the surface resistance values of the conductive layers CDL are 1 M$\Omega$/□ and 5 M$\Omega$/□, a contact on the detection surface failed to be sensed. On the other hand, in cases where the surface resistance values of the conductive layers CDL are 10 M$\Omega$/□, 50 M$\Omega$/□, 100 M$\Omega$/□, 500 M$\Omega$/□, 800 M$\Omega$/□, and 1000 M$\Omega$/□, a contact on the detection surface was successfully sensed. Based on this experiment, it was confirmed that the lower limit value of the surface resistance value of the conductive layer CDL is 10 M$\Omega$/□.

As has been described above, according to the present embodiment, a liquid crystal display device with a good display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
an array substrate including a first insulative substrate with light transmissivity, a first optical element disposed on an outside of the first insulative substrate, and a gate line, a source line, a switching element, a pixel electrode, a common electrode and a pad of ground potential which are formed, respectively, on an inside of the first insulative substrate, the gate line extending in a first direction, the source line extending in a second direction crossing the first direction, the switching element being electrically connected to the gate line and the source line, the pixel electrode being electrically connected to the switching element, and the common electrode being opposed to the pixel electrode via an insulation layer;
a counter-substrate including a second insulative substrate which is opposed to the array substrate and has light transmissivity, and a second optical element disposed on an outside of the second insulative substrate;
a sealant which attaches the array substrate and the counter-substrate;
a liquid crystal layer surrounded by the sealant and held between the array substrate and the counter-substrate;
a cover glass disposed on an outside of the counter-substrate and having a larger size than the array substrate;
an electrically conductive layer of a tin (Sn)-antimony (Sb)-based oxide, the electrically conductive layer being formed on a surface of the cover glass up to an end portion of the cover glass, wherein a surface resistance value of the electrically conductive layer is $1 \times 10^9 \Omega/\square$ or less,
an adhesive bonding the counter-substrate and the cover glass, and covering an entire surface of the counter-substrate and the second optical element, and
a connection member configured to electrically connect the electrically conductive layer and the pad,
wherein each of the adhesive and the connection member is formed of a resin material,
the connection material is formed of the resin material containing electrically conductive particles and maintains a gap between the array substrate and the cover glass, and
the adhesive does not contain electrically conductive particles.

2. The liquid crystal display device of claim 1, wherein the array substrate further includes a sensing element configured to detect an object, and the surface resistance value of the electrically conductive layer is $1 \times 10^7 \Omega/\square$ or more.

3. The liquid crystal display device of claim 1, wherein the connection member and the adhesive are in contact with each other.

4. The liquid crystal display device of claim 1, wherein the connection member is not in contact with the second optical element.

5. The liquid crystal display device of claim 1, further comprising a signal supply source mounted in the array substrate,
wherein the connection member is not in contact with the signal supply source.

6. The liquid crystal display device of claim 5, wherein in a plan view, the electrically conductive layer and the cover glass overlap the signal supply source.

7. The liquid crystal display device of claim 6, wherein the pad is grounded via the signal supply source.

8. The liquid crystal display device of claim 7, wherein the signal supply source includes a driving IC chip and a flexible printed circuit board.

9. The liquid crystal display device of claim 5, wherein the pad includes a first pad and a second pad which are provided on both sides of the signal supply source.

* * * * *